United States Patent Office 2,828,834
Patented Apr. 1, 1958

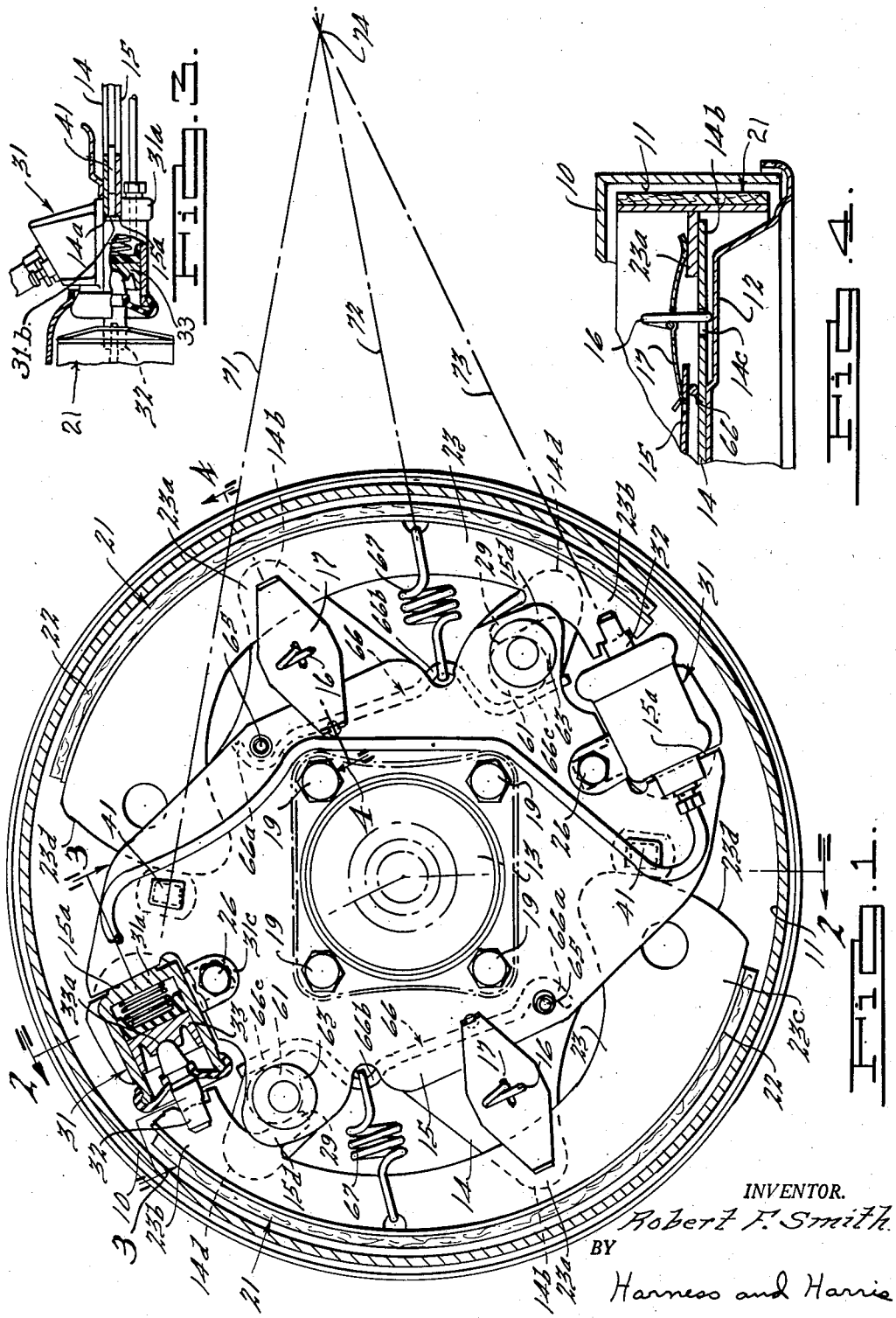

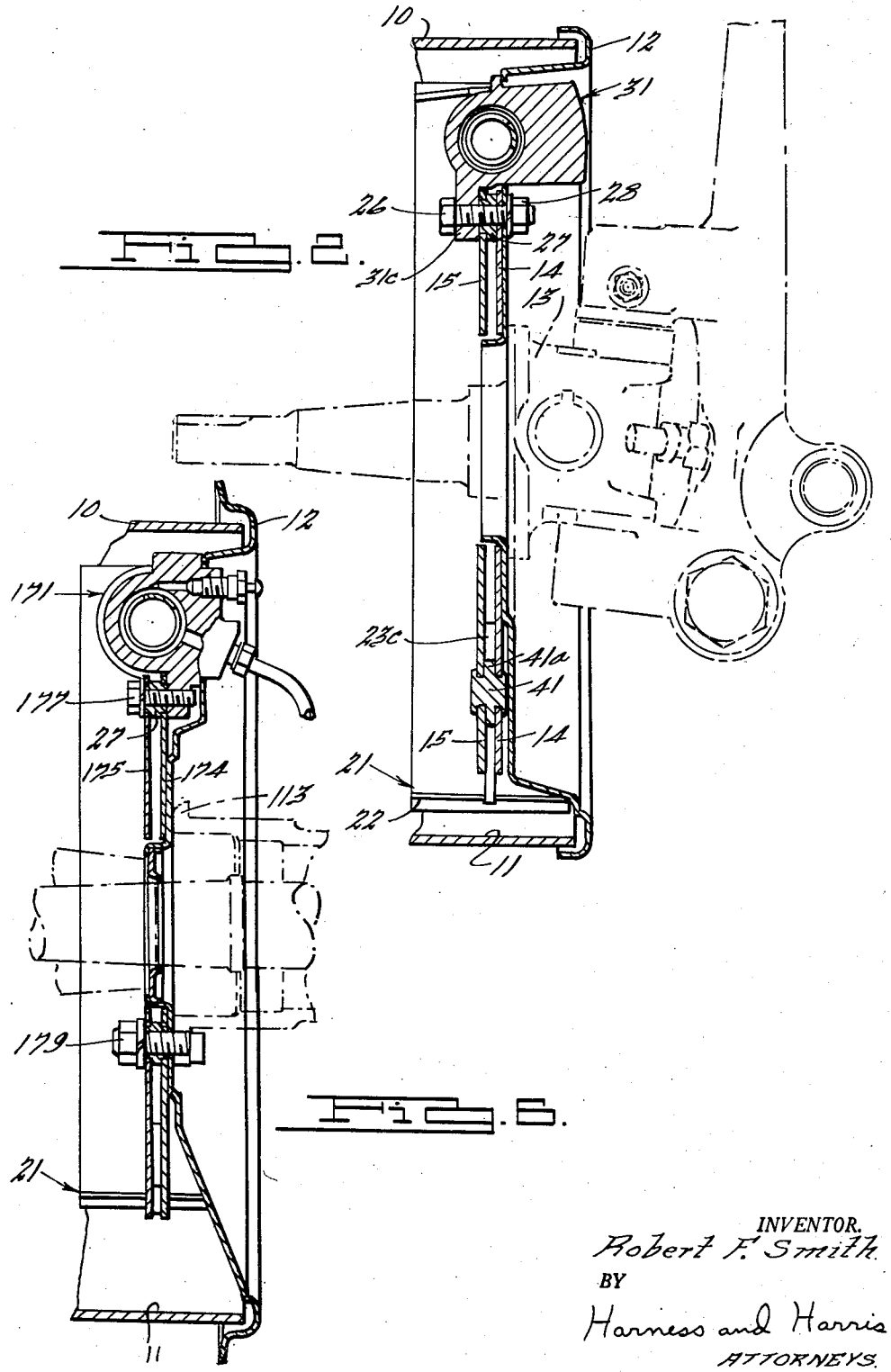

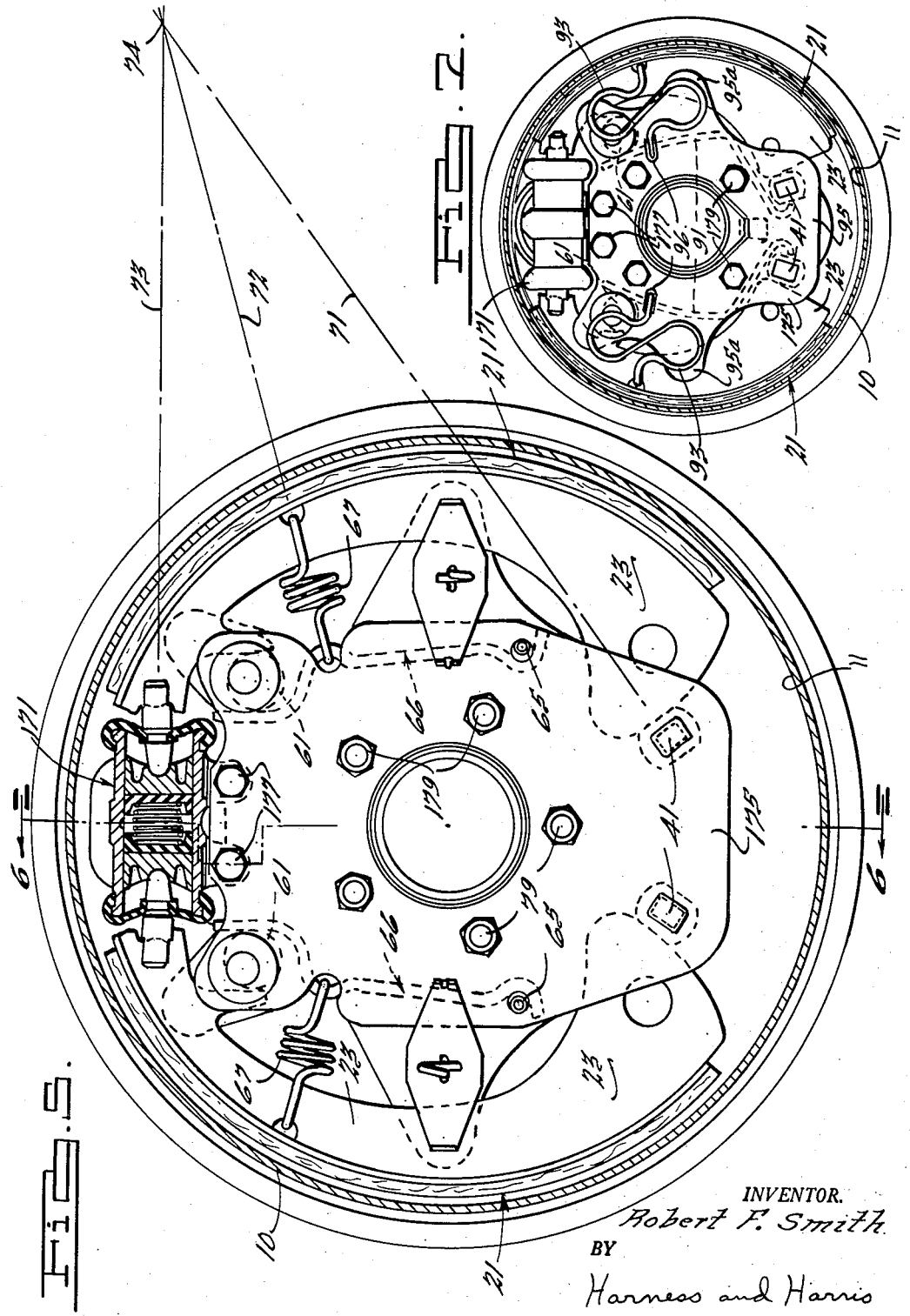

2,828,834

CENTER PLANE FLOATING SHOE BRAKE

Robert F. Smith, Detroit, Mich., assignor to Chrysler Corporation, Highland Park, Mich., a corporation of Delaware Application July 9, 1953, Serial No. 367,023

7 Claims. (Cl. 188—78)

This invention relates to friction brake assemblies of the type having self-adjusting, self-energizing, floating brake shoes which are adapted to be expanded into engagement with the encircling flange portion of a rotatable, brake drum.

It is a primary object of this invention to provide an improved and simplified form of brake assembly composed primarily of stamped elements which elements are arranged in such a manner that the brake shoes and the actuating mechanism therefor are centered with respect to the members taking the brake reaction. Such an arrangement eliminates torsional loads and turning moments during braking which latter forces cause tilting or cocking of the brake shoes. The centered arrangement also prevents the development of unnecessarily high stresses in the elements of the brake assembly, and loss of pedal travel during application of the brakes.

It is a further object of this invention to provide a brake assembly in which the brake shoes and the actuating mechanism therefor are mounted on a pair of spaced plates with the shoe webs positioned between the pair of plate-like supporting members which members guide the movement of the shoes and associated brake linkage, take the brake reaction directly, and provide a means whereby the brake assembly may be assembled as a unitary structure for convenient handling and installation.

It is an additional object of this invention to provide a brake assembly in which the number of required elements has been reduced to a minimum and the required elements simplified in design so that they may be formed primarily from relatively light weight, symmetrically shaped stampings. Such a construction makes this brake assembly one that is economical to manufacture and install, yet highly efficient as to braking action, and extremely durable in service.

It is an additional object of this invention to provide a multi-shoe brake assembly in which the several shoes and the actuating linkages therefor are identical in design and readily interchangeable.

It is a further object of this invention to provide a brake assembly in which the spaced, symmetrically arranged brake shoe guiding and supporting members mount the complete shoe actuating mechanism in such a manner that the stresses applied to the assembly during braking are kept to a minimum and all forces tending to tilt or cock the brake shoes and associated elements are eliminated.

It is another object of this invention to provide a brake assembly in which the movable brake shoes are positively guided during all movement and retained in their most efficient braking position during brake application.

It is still another object of this invention to provide novel means for adjusting and retracting the brake shoes.

Additional objects and advantages of this invention will be apparent from a reading of the attached specification and a consideration of the related drawings wherein:

Fig. 1 is a side elevational view of a front wheel brake assembly embodying this invention with certain parts thereof shown in section;

Fig. 2 is a sectional elevational view of the brake assembly shown in Fig. 1, the view being taken along the line 2—2 of Fig. 1 looking in the direction of the arrows;

Fig. 3 is a fragmentary sectional elevational view of portions of the brake assembly shown in Fig. 1, the view being taken along the line 3—3 of Fig. 1 looking in the direction of the arrows;

Fig. 4 is another fragmentary sectional elevational view of portions of the brake assembly shown in Fig. 1, the view being taken along the line 4—4 of Fig. 1 looking in the direction of the arrows;

Fig. 5 is a side elevational view of a rear wheel brake assembly embodying this invention with certain parts thereof being shown in section;

Fig. 6 is a sectional elevational view of the brake assembly shown in Fig. 5, the view being taken along the line 6—6 of Fig. 5 looking in the direction of the arrow; and Fig. 7 is a reduced size side elevational view of a form of rear wheel brake assembly similar to that shown in Fig. 6, but showing a modified form of brake shoe return spring.

Referring to the drawings in detail, the brake assembly embodying my invention includes an annular brake drum 10 which is adapted to be secured to the rotatable member to be braked, such as the road wheel of a motor vehicle. The numeral 12 designates a plate for enclosing the open side of the drum 10, plate 12 being adapted to be mounted on a relatively fixed supporting member 13, such as the rear axle housing or the front steering knuckle of a vehicle chassis, depending on whether the brake assembly is for a rear or front vehicle wheel respectively. Plate 12 in this construction serves only as a dust cover for the brake assembly and is not required to transmit any brake reaction forces due to the fact that the spaced apart plate members 14, 15 which support the brake shoe actuating mechanism on the housing 13, are specifically designed to function as torque plates and thus provide the means for taking the brake reaction between the brake shoes 21 and the brake drum 10. The plates 14, 15 are similar in construction and are each formed with a pair of diametrically disposed, L-shaped seat portions 14a, 15a which are formed as indentations along the periphery of the plates 14, 15. The seats 14a, 15a are adapted to receive the fluid brake shoe actuating motors 31 which are subsequently described in detail. Plate 14 also includes the diametrically disposed portions 14b which are spaced approximately ninety degrees circumferentially from the L-shaped motor seat portions 14a. Portions 14b of the spaced plate 14 provide bearing portions against which the centrally located portions 23a of the brake shoe web portions 23 may be guidingly mounted. Spring pins 16 extend through aligned slots 14c in the plate 14 and are anchored to dished clips 17 so as to frictionally and movably anchor the brake shoes 21 to the plate 14. (See Fig. 4.) The spaced apart plates 14, 15 are connected to the relatively fixed housing member 13 by the bolts 19. Spacer members, not shown, are mounted on the bolts 19 between the plates 14, 15 to maintain the spaced relationship of the plate 14 and to provide a rigid connection between the spaced plates 14, 15 and the housing 13. The plate 14 also includes a pair of oppositely disposed extended portions 14d that provide guide portions for the toe portions 23b of the brake shoe webs 23. Plate 15 has portions 15d that overlie the portions 14d of plate 14 and provide therewith guide slots for the toe portions 23b of the brake shoe web portions 23.

The brake shoe actuating mechanisms comprise the hydraulically operated motors 31 and associated linkages. Motors 31 are mounted in the L-shaped seats 14a, 15a in the spaced plates 14, 15 with the closed end portions 31a of the motor cylinders 31 bearing against the edges 14a, 15a of the L-shaped plate seats. With this arrangement the brake reaction is transmitted directly from the motors 31 to the plates 14, 15 to the support housing 13. The closed ends 31a of the motors 31 are each formed with a slot 31b (see Fig. 3) that receives the end edges 14a, 15a of the plates 14, 15. To fixedly connect the motors 31 to the spaced plates 14, 15, the motors 31 have a depending ear portion 31c that is pierced by an aperture that is adapted to receive a bolt connector 26. Ear portion 31c of the cylinder 31 is placed flush against the outer side of the plate 15 and a nut type of spacer 27 is aligned with the ear 31c and mounted between the plates 14, 15. The bolt connector 26 is passed through the aperture in the ear 31c and threaded into spacer nut 27 so as to lock the motor 31 to the plate 15 and to the spacer nut 27. When the nut 28 is threaded on the threaded end of the bolt 26 then the motor 31 is anchored to both plates 14, 15 and a rigid assembly is provided. Bolt 26 does not have to take the brake reaction but merely holds the parts in assembled relationship. As the centrally arranged brake shoes web portions 23 and the actuating motors 31 are all arranged with their force transmitting portions positioned centrally between the plate members 14, 15 an arrangement is provided in which there is little chance for the development of torsional loads or bending moments that would tend to tilt or cock the brake shoes and increase the stress concentrations in the various elements of the brake assembly. This balanced mounting of the brake shoe actuating mechanism and the advantages thereof will become more readily apparent from the subsequent description.

Movably mounted between the plate members 14, 15 are the webs 23 of the pair of identical, arcuately shaped, brake shoes 21. Each shoe 21 has a lined peripheral rim or table flange 22 that is adapted to be frictionally engaged with the inner axially extending, cylindrical braking surface 11 of the brake drum 10. Each shoe 21 has a web portion 23 that extends centrally of the width of the shoe rim 22 and normal thereto. The toe end portion 23b of the shoe web 23 is adapted to be connected to the shoe actuating motor 31. This toe end portion of the shoe web also is formed with a radially extending substantially inwardly directed finger portion 29 that is adapted to be engaged with a rotatably mounted eccentric shoe adjusting cam 61. The heel end portion 23c of the shoe web 23 is enlarged in width and the end edge 23d thereof is convexly curved to provide a rounded portion that will roll and/or slide along an engaged anchor surface such that the shoe may float and be self-adjusting and self-energizing.

Brake shoe web 23 is of varying depth along its length such that the depth reaches minimum dimensions intermediate the end portions of the shoe. This reduced depth of the shoe web 23 at an intermediate portion along the shoe length permits a degree of flexing or "hooping" of the shoe about the reduced depth portion of the shoe web when the shoe is subjected to compressive forces lengthwise thereof during braking action. This flexing of the shoe permits the shoe to deform in a complementary manner to the deformation of the brake drum braking surface 11 during braking action and thus a continuous, substantially 100 percent area of contact between the lined shoe rim 22 and the surrounding brake drum surface 11 is maintained during braking action. This self-adjusting action of the flexible shoe combines with the self-adjusting action of the floating brake shoe to give optimum braking performance as well as increased brake life due to the relatively low braking pressures and relatively low heat generation.

The anchor members 41 for the brake shoes 21 are rivet type spacer elements that each have an enlarged centrally disposed portion 41a located between the spaced plates 14, 15. Anchor 41 also has a pair of outwardly projecting end portions that are fixed in apertures in the spaced plates 14, 15 by conventional rivet type connections. A side edge of the centrally disposed portion 41a of the anchor 41 provides a flat ramp surface along which the rounded heel end edge 23d of the brake shoe web portion may roll and/or slide. The anchor elements 41 not only provide brake shoe reaction surfaces but in addition they provide spacer elements for the spaced plates 14, 15 and connections for the plates that rigidify the brake assembly.

As the actuating mechanism for each of the brake shoes 21 is identical, only that for the left shoe will be described. Left brake shoe 21 has its web portion 23b at the upper or toe end connected to a plunger rod 32 that is adapted to be actuated by the movable piston 33 of the fluid motor 31. Fluid motor 31 is the so-called wheel cylinder of a conventional hydraulic brake system. Motor 31 comprises a cup-shaped cylinder within which the piston 33 is reciprocably mounted. Piston 33 is formed with a concave seat 33a adapted to be engaged by the adjacent rounded end of the plunger rod 32. Pressurized brake fluid is admitted to the bore of cylinder 34 through a port not shown. Motor 31 is mounted in the L-shaped seats 14a, 15a in the edges of the plates 14, 15 with the closed end 31a of the motor cylinder 31 abutting against the vertically disposed edges of the aligned seats 14a, 15a. These engaged surfaces thus provide a rigid, centered connection to take the brake reaction transmitted to the motor 31 from the shoes 21. The engagement of the closed end 31a of the cylinder 31 with the edges of the L-shaped seats 14a, 15a in the plates 14 relieves the bolt 26 of any brake reaction stresses. The bolt 26 is required to merely connect the motor 31 to the plates 14, 15. When the brake assembly is detached from the supporting housing 13 the bolts 26 also provide a means for retaining the elements of the brake assembly as a completely assembled unit which facilitates handling and installation thereof.

From Figs. 2 and 3 it is thought to be obvious that a brake assembly has been provided in which the spaced apart brake shoe guiding plates 14, 15 are adapted to also serve as the means for directly mounting the brake assembly on the brake assembly supporting member 13. This arrangement whereby the brake shoe actuating mechanism is located centrally between the plates 14, 15 and supported thereon permits the plates 14, 15 to directly resist the brake reaction. As the brake shoe actuating mechanism 31, 32 is centrally mounted between and supported by the plates 14, 15 it is obvious that the brake reaction will be equally distributed between the spaced plates 14, 15 and that the brake reaction will not develop bending moments in the plates or associated elements which would tend to tilt or cock the brake shoes or unnecessarily stress the various elements of the brake assembly. All forces generated during braking are transmitted in a plane that is parallel to and extends centrally between the plates 14, 15 therefore the brake reaction develops direct compression loads or shear forces rather than eccentric loads which would cause bending moments in the plates 14 and associated elements. By reducing the stresses in the various elements of the assembly the size of the elements can be reduced and the complete brake assembly simplified and reduced in size and cost.

Each of the brake shoes 21 has a radially extending finger 29 projecting from its web portion 23b adjacent the toe end of the shoe. Each web finger 29 is adapted to cooperate with a rotatable cam element 61 that is carried by the brake support plates 14, 15 so as to provide a mechanism to set and adjust the clearance between the brake shoe lined flanges 22 and the encircling drum flange 11. Cam element 61 has an eccentrically mounted portion that is adapted to be engaged with and to slide along the edge surface of the brake shoe web finger 29 during rotation of the cam element 61. It is thought to be obvious that rotation of the cam element 61 will cause it to act upon the web finger 29 such that the associated brake shoe will be moved relative to the encircling brake drum 10. Cam element 61 has a Belleville type spring washer 63 encircling the shaft of the cam element and engaged with the outer side of brake support plate 15 so as to provide a friction force that will retain the cam element 61 in its adjusted position. The rotatable shaft of the cam element 61 is preferably formed with flat faces (not shown) that are readily engaged by a wrench or the like to facilitate rotation of the cam element.

The rotatable shoe clearance adjusting cam elements 61 not only provide means to adjust the drum clearance between the brake shoes 21 and the encircling drum flange 10, but in addition, these cam elements 61 provide a portion of the brake shoe return spring anchor means. The brake shoe return spring mechanism shown is of the type shown in the copending application of Robert F. Smith, Serial No. 286,934 filed May 9, 1952, and now Patent Number 2,765,051. This particular clearance adjusting construction provides a brake shoe return spring mechanism that is easy to assemble, economical, durable, and one that will give the maximum free space within the brake assembly. The brake shoe return spring mechanism disclosed readily accomplishes each of these noted objects. The shoe clearance adjusting and shoe return spring mechanisms associated with the brake shoes 21 each comprise an anchor stud 65 that is carried by the spaced brake support plates 14, 15. Extending between the anchor stud 65 and the eccentrically mounted cam 61 is a rod type strut member 66. Strut member 66 has its end 66a curved to seat about the associated anchor stud 65. Intermediate the ends of strut 66 a curved seat 66b is formed to provide an anchor for one end of a resilient tension spring element 67. The other end of the spring element 67 is anchored in an aperture formed in the web 23 of the associated brake shoe 21. The other end portion 66c of the strut 66 is substantially straight and is adapted to press tangentially against the cam 61 and to permit the cam 61 to slide therealong during adjustment of the brake shoe drum clearance.

It will be noted that the shoe return springs 67 exert a force along a line 72 that tends to pull the heel end edge 23d of the associated brake shoe against its anchor ramp 41 and to also retract the toe end of the associated shoe toward its actuating wheel cylinder 31. Thus the shoe return spring 67 not only retracts the shoe, but also tends to maintain the shoe heel end 23d in its adjusted position against the anchor ramp 41.

In addition to being formed of inexpensive, simple parts, this shoe return spring mechanism is designed so that minimum size springs 67 may be used and these small springs kept within their elastic limits regardless of the amount of brake shoe lining wear and consequent brake shoe adjustment. By anchoring the end 66c of the strut 66 against the eccentrically mounted shoe adjusting cam port 62, it will be seen that as the shoe is adjusted and moved outwardly to compensate for lining wear, that the strut 66 also moves outwardly and consequently no increased stresses are set up in the return spring 67. This theory is more thoroughly explained in the copending Robert F. Smith application Serial No. 286,934, now Patent No. 2,765,051 that was previously mentioned. As the spring stresses set up in return springs 67 are more or less fixed and relatively low, a small size, inexpensive return spring may be utilized. Furthermore, as the springs 67 do not extend between the pair of opposed brake shoes 21 there is provided the maximum free space within the brake assembly. Due to the low strength springs 67 and their arrangement in the brake assembly, it is possible to assemble the return springs 67 in the brake assembly without the use of any special spring stretching tools or the like and thus time and cost of brake assembly is materially reduced. Also, it will be noted that the struts 66 are located between the plates 14, 15 and thus they do not occupy needed space within the brake assembly.

The principles of "floating shoe" control, disclosed in the copending application of A. R. Trahern, Serial No. 256,706, filed November 16, 1951, and now Patent Number 2,740,498 have been applied to the brake assembly embodying this invention, for it will be noted that the lines of action 71, 72, 73 of the several forces acting on the shoe 21, all converge towards the common center 74. Accordingly, there are no moments tending to shift the heel end 23c of the shoe 21 along the anchor ramp 41 so as to alter the self-centering or self-adjusting action of the shoes of this brake assembly. Line of action 71 is the line along which the force line of the anchor plate reaction acts. Line of action 72 is the line of action of the brake shoe return spring 67. Line of action 73 is the line of action of the wheel cylinder piston 33 that actuates the brake shoe 21. As these lines 71, 72, 73 all intersect at 74, a stable, self-adjusting "floating shoe" brake is provided.

From the foregoing description of this brake assembly, it will be seen that the pair of spaced apart reaction plates 14, 15 provide a centrally arranged means for mounting the brake shoe actuating motors 31 and for taking the brake reaction forces. In addition the spaced plates 14, 15 provide a slotted construction for guiding the web portions 23 of the brake shoes. With the construction shown the brake shoe web portions 23 are sandwiched between the spaced plates 14, 15 at their heel and toe ends as well as at their mid-length locations and thus the shoes are readily maintained in their desired positions and prevented from cocking or tilting. The spaced plates 14, 15 also provide a recess therebetween in which the brake shoe anchor studs 41 may be mounted and this recess further provides a space for the brake shoe clearance adjusting mechanism 61, 66 Accordingly, the maximum free space is available within the brake drum due to practically all of the brake mechanism parts being located in the space between the spaced reaction plates 14, 15.

Figs. 5 and 6 show the application of this invention to a rear wheel brake assembly wherein a single double piston wheel cylinder 171 is utilized and the brake shoes 21, which are identical to the shoes used in the front wheel assembly, are arranged such that only one shoe is self-energizing in each direction of rotation of the brake drum 10. All elements of the rear wheel brake assembly, that are identical to similar elements in the front wheel assembly, carry corresponding reference numerals. In Figs. 5 and 6 a pair of spaced apart plates, 174, 175 are arranged centrally of the width of the brake shoes with the slot therebetween guidingly receiving the web portions 23 of the brake shoes 21. The spaced plates 174, 175 have the wheel cylinder 171 mounted thereon by means of the bolt connectors 177 in a manner similar to the connection of the wheel cylinders 31 to the plates 14, 15. The reaction plates 174, 175 are mounted on the axle housing support 113 by means of the bolt and nut connectors 179. The prime distinction between the front wheel and rear wheel brake assemblies shown respectively in Figs. 1–4 and Figs. 5 and 6 is that the wheel cylinders 31, 171 and the shoe anchors 41 are differently arranged in the two assemblies.

Fig. 7 shows a rear wheel assembly similar to Figs. 5 and 6 but having a modified brake shoe return spring mechanism from that shown in Figs. 5 and 6. In the Fig. 7 assembly the rod-like struts 91 located between the spaced plates 95, 95 extend between the rotatable eccentric cams 61 and the brake shoe anchor blocks 41. By this construction the separate anchor pins 65 for the fixed end of the struts 66, shown in Figs. 1–6, are eliminated. Also it will be noted that a flat S-shaped spring 93, rather than a coil spring 67, is used to resiliently connect the struts 91 to the web portions 23 of the brake shoes 21. The brake assembly shown in Fig. 7 has a pair of spaced apart reaction plates 95 that are identical in construction. It will be noted that these plates are pierced with openings 96 to receive the anchored ends of the springs 93 that are connected to the rod-like struts 91. It will also be noted that both reaction plates 95 have opposed, aligned pairs of finger portions 95a that overlap the center portions of the associated brake shoe webs 23 such that a guide slot is provided to maintain the brake shoe in its desired position. The plates 95 also provide guide slots for the brake shoe web portions 23 at both the toe and heel ends as was the case with the Figs. 1–6 constructions.

I claim:

1. In a brake, a rotatable brake drum having an axially extending braking surface, a fixed support, a pair of parallel, spaced apart reaction plate members mounted on said support so as to extend in a plane normal to and transversely of the braking surface of said drum, an arcuate brake shoe of T-shaped cross section having a rim flange portion arranged substantially concentrically within and adapted to be frictionally engaged with the braking surface of said drum, said shoe having a web portion normal to said rim flange portion and disposed in a plane located centrally of the width of said rim flange portion, said web having portions thereof extending into the space between and arranged to be guidingly supported by said spaced plate members, an anchor member fixed to and arranged to extend transversely between said plates, said anchor member providing a fixed ramp surface between said plates engaged by and along which a rounded portion on one end of the brake shoe web portion may roll and/or slide, brake shoe actuating means fixedly mounted on said plates, said actuating means including centrally disposed movable portions connected to the other end of said brake shoe web portion and adapted to apply a braking force to the centrally disposed web of said brake shoe in a plane extending parallel to and located centrally between said plate members whereby the plate members are adapted to directly resist the brake reaction during braking while guidingly supporting the brake shoe to prevent tilting thereof, a brake shoe clearance adjusting cam rotatably mounted on and located between said spaced plates having portions thereof engageable with a portion of the brake shoe web portion located between said spaced plates, and a brake shoe retracting mechanism comprising a strut member arranged between said spaced plates and having one of its ends pivotally anchored to a fixed support located between said plates and the other of its ends tangentially engaged with said brake shoe clearance adjusting cam, and a resilient means tensioned between and interconnecting an intermediate portion of said strut and the associated brake shoe.

2. In a brake, a rotatable brake drum having an axially extending brake surface, a fixed support, a pair of parallel, spaced apart reaction plate members mounted on said support so as to extend in a plane normal to and transversely of the braking surface of said drum, an arcuate brake shoe of T-shaped cross section having a rim flange portion arranged substantially concentrically within and adapted to be frictionally engaged with the braking surface of said drum, said shoe having a web portion normal to said rim flange portion and disposed in a plane located centrally of the width of said rim flange portion, said web having portions thereof extending into the space between and arranged to be guidingly supported by said spaced plate members, an anchor member fixed to and arranged to extend transversely between said plates, said anchor member providing a fixed ramp surface between said plates engaged by and along which a rounded portion on one end of the brake shoe web portion may roll and/or slide, brake shoe actuating means fixedly mounted on said plates, said actuating means including centrally disposed movable portions connected to the other end of said brake shoe web portion and adapted to apply a braking force to the centrally disposed web of said brake shoe in a plane extending parallel to and located centrally between said plate members whereby the plate members are adapted to directly resist the brake reaction during braking while guidingly supporting the brake shoe to prevent tilting thereof, a brake shoe clearance adjusting cam rotatably mounted on and located between said spaced plates having portions thereof engageable with a portion of the brake shoe web portion located between said spaced plates, and a brake shoe retracting mechanism comprising a strut member arranged between said spaced plates and having one of its ends pivotally anchored to said brake shoe anchor member located between said plates and the other of its ends tangentially engaged with said brake shoe clearance adjusting cam, and a resilient means tensioned between and interconnecting an intermediate portion of said strut and the associated brake shoe.

3. In a brake, a rotatable brake drum having an axially extending braking surface, a fixed support, a pair of parallel, spaced apart reaction plate members mounted on said support so as to extend in a plane normal to and transversely of the braking surface of said drum, an arcuate brake shoe of T-shaped cross section having a rim flange portion arranged substantially concentrically within and adapted to be frictionally engaged with the braking surface of said drum, said shoe having a web portion normal to said rim flange portion and disposed in a plane located centrally of the width of said rim flange portion, said web having portions thereof extending into the space between and arranged to be guidingly supported by said spaced plate members, an anchor member fixed to and arranged to extend transversely between said plates, said anchor member providing a fixed ramp surface between said plates engaged by and along which a rounded portion on one end of the brake shoe web portion may roll and/or slide, brake shoe actuating means fixedly mounted on said plates, said actuating means including centrally disposed movable portions connected to the other end of said brake shoe web portion and adapted to apply a braking force to the centrally disposed web of said brake shoe in a plane extending parallel to and located centrally between said plate members whereby the plate members are adapted to directly resist the brake reaction during braking while guidingly supporting the brake shoe to prevent tilting thereof, a brake shoe clearance adjusting cam rotatably mounted on and located between said spaced plates having portions thereof engageable with a portion of the brake shoe web portion located between said spaced plates, and a brake shoe retracting mechanism comprising a strut member arranged between said spaced plates and having one of its ends pivotally anchored to a fixed support located between said plates and the other of its ends tangentially engaged with said brake shoe clearance adjusting cam, and an S-shaped, flat resilient means tensioned between and interconnecting an intermediate portion of said strut and the associated brake shoe.

4. In a brake assembly, a rotatable brake drum having an interiorly disposed braking surface, a support, a pair of parallel, spaced apart, torque plate members detachably connected to said support and arranged to extend in a plan normal to and transversely of the braking surface of said drum, a pair of diametrically disposed anchor members mounted on and positioned to extend between and to space the plate members, a pair of diametrically arranged substantially L-shaped indentations formed in the side edges of each of said plate members, a brake shoe actuating motor mounted in each of the L-shaped seats in the side edges of said plate members and arranged so as to directly transmit the brake reaction to said plate members, fixed projections on said motors connected to said plate members, a movable plunger member carried by each of said motors having force transmitting portions thereof extending in a plane located between and parallel to said plate members, a pair of diametrically arranged arcuate brake shoes each having a rim flange portion disposed adjacent to and adapted to be frictionally engaged with the braking surface of said drum, said brake shoes each having a web portion extending normal to and disposed centrally of the width of said rim flange portion, said web portions having portions thereof arranged between said plate members so as to be guidingly embraced thereby, means connecting one end of the web portion of each shoe to a movable plunger and the other end of the web portion of each shoe to one of the anchor members, said last mentioned end of the shoe web portion being formed so as to roll and/or slide along the engaged anchor member so as to provide a self-adjusting, self-energizing brake shoe, a brake shoe clearance adjusting cam rotatably mounted on said plate members adjacent each brake shoe, said cams each having a portion thereof located between said plate members and engageable with portions of the adjacent brake shoe located between said plate members, and a brake shoe retracting mechanism associated with each brake shoe comprising a strut member arranged between said spaced plates and having one of its ends pivotally anchored to a fixed support located between said plates and the other of its ends tangentially engaged with said brake shoe clearance adjusting cam, and a resilient means tensioned between and interconnecting an intermediate portion of said strut and the associated brake shoe.

5. In a brake assembly, a support, a rotatable brake drum mounted on said support having an annular, axially extending braking surface, a pair of parallel, spaced-apart torque plate members mounted on said support and arranged to extend in planes normal to and transversely of the braking surface of said drum, an anchor member mounted between and carried by at least one of said plate members, brake shoe actuating means mounted on at least one of said plate members and spaced from said anchor member, a brake shoe extending circumferentially of the drum between said anchor member and said actuating means, said brake shoe having a flange portion adapted to be moved into frictional engagement with the braking surface of said drum and an integral web portion extending normal to said flange portion, said web portion having portions thereof extending between said plate members and arranged to be guided thereby, brake shoe drum clearance adjusting means arranged between said plate members and carried by at least one of said plate members having portions engageable with portions of the brake shoe web that extend between said plate members, a strut element located between said plate members and extending between said clearance adjusting means and said anchor member, and resilient means connected between said strut element and said brake shoe.

6. In a brake assembly, a support, a rotatable brake drum mounted on said support having an annular, axially extending braking surface, a pair of parallel, spaced-apart torque plate members mounted on said support and arranged to extend in planes normal to and transversely of the braking surface of said drum, an anchor member mounted between and carried by at least one of said plate members, brake shoe actuating means mounted on at least one of said plate members and spaced from said anchor member, a brake shoe extending circumferentially of the drum between said anchor member and said actuating means, said brake shoe having a flange portion adapted to be moved into frictional engagement with the braking surface of said drum and an integral web portion extending normal to said flange portion, said web portion having portions thereof extending between said plate members and arranged to be guided thereby, brake shoe drum clearance adjusting cam means arranged between said plate members and rotatably mounted on at least one of said plate members having cam portions engageable with portions of the brake shoe web that extend between said plate members, a strut element located between said plate members and extending between cam portions of said clearance adjusting means and said anchor member, and resilient means connected between said strut element and said brake shoe.

7. In a brake, a rotatable brake drum having an axially extending braking surface, a fixed support, a pair of parallel, spaced apart reaction plate members mounted on said support so as to extend in a plane normal to the braking surface of said drum, a pair of arcuate brake shoes engageable with a major portion of the drum braking surface, each shoe of T-shaped cross section having an axially extending rim flange portion arranged substantially concentrically within and adapted to be frictionally engaged with the braking surface of said drum, said shoe having a web portion normal to said rim flange portion and disposed in a plane located substantially centrally of the width of said rim flange portion, said web having portions thereof extending into the space between and arranged to be guidingly supported by said spaced plate members, the depth of said web portion varying along the length thereof and being of minimum dimension intermediate the ends of the web and increasing progressively at a calculated rate from said intermediate point towards the opposite ends of the web to provide a degree of lengthwise hooping flexibility in the shoe under endwise compressive action, an anchor member fixed to an arranged to extend transversely between said plates, said anchor member providing fixed, substantially radially extending ramp surfaces between said plates engaged by and along which a rounded portion on one end of each brake shoe web portion may roll and/or slide during braking action, brake shoe actuating means fixedly mounted on said plates, said actuating means including force transmitting movable portions connected to the other end of each brake shoe web portion and adapted to apply a brake applying force to the centrally disposed web of each brake shoe whereby each brake shoe will be compressed between the actuating means and the anchor member during braking action and the total contact area of the rim flange portion flexed into mating frictional engagement with the surrounding drum braking surface during braking action and resilient, radially extending, brake shoe retracting means connecting said shoes to said reaction plate members and acting in a plane extending therebetween.

References Cited in the file of this patent

UNITED STATES PATENTS

| | | |
|---|---|---|
| 2,171,585 | Mattersdorf | Sept. 5, 1939 |
| 2,389,096 | Walker | Nov. 13, 1945 |
| 2,429,815 | House | Oct. 28, 1947 |
| 2,475,491 | Goepfrich et al. | July 5, 1949 |
| 2,509,643 | House | May 30, 1950 |
| 2,642,959 | Freer | June 23, 1953 |

U. S. DEPARTMENT OF COMMERCE
PATENT OFFICE

CERTIFICATE OF CORRECTION

Patent No. 2,828,834     Robert F. Smith     April 1, 1958

It is hereby certified that error appears in the printed specification of the above numbered patent requiring correction and that the said Letters Patent should read as corrected below.

Column 6, line 42, after the numeral "66" insert a period; column 8, line 68, for "plan" read -- plane --; column 9, line 15, after "plunger" insert -- member --; column 10, line 40, for "an arranged" read -- and arranged --; line 42, after "extending" insert a comma.

Signed and sealed this 27th day of May 1958.

(SEAL)
Attest:

KARL H. AXLINE

Attesting Officer

ROBERT C. WATSON
Commissioner of Patents